United States Patent [19]

Freeman

[11] 4,231,061
[45] Oct. 28, 1980

[54] INSTANT COLOR SLIDE RECORDER OF CRT IMAGE

[76] Inventor: Samuel Freeman, 13 Birchwood Ct. East, Syosset, N.Y. 11791

[21] Appl. No.: 28,199

[22] Filed: Apr. 9, 1979

[51] Int. Cl.³ ............................................. H04N 1/46
[52] U.S. Cl. ....................................... 358/76; 358/244
[58] Field of Search ........................... 358/76, 81, 244

[56] References Cited
U.S. PATENT DOCUMENTS
2,680,148   6/1954   Purington et al. .................... 358/244

FOREIGN PATENT DOCUMENTS
2839248   3/1979   Fed. Rep. of Germany ........... 358/244

Primary Examiner—Richard Murray

[57] ABSTRACT

This invention relates to the photographic reproduction of color or monochromatic still pictures as displayed on the face of a cathode-ray tube (CRT). The invention combines the arts of television and photographics to make possible the retention of still color photographs (slides) from a television screen. A "frame grabber" is used to stop the motion of a television image and hold it while a simple color photographic process captures it.

9 Claims, 13 Drawing Figures

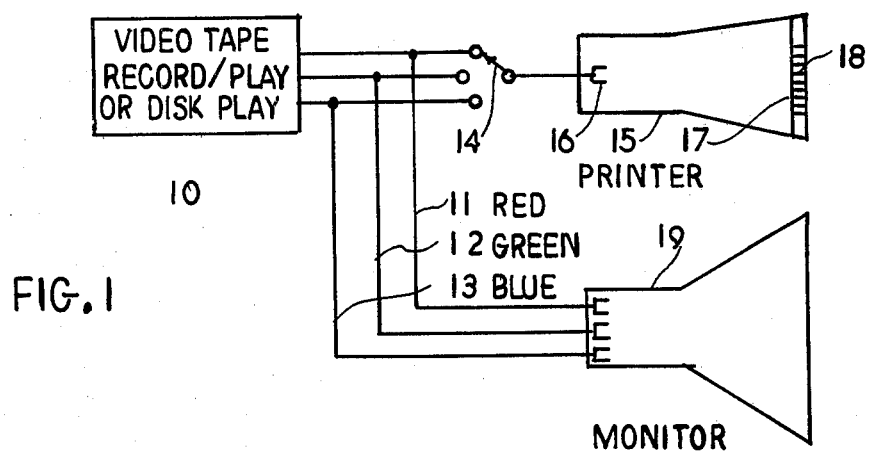
FIG. 1
FIG. 2  FILM FORMATS
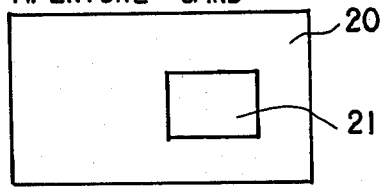
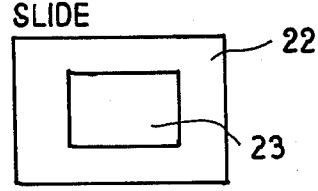
FIG. 3  EXPOSURE SEQUENCE
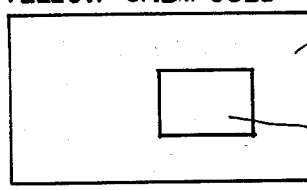
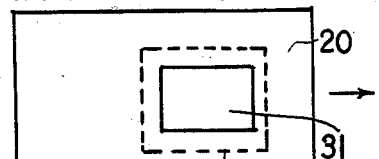
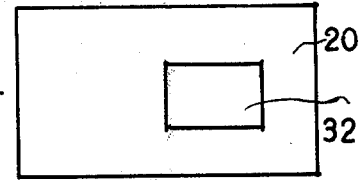
FIG. 4  DEVELOPING SEQUENCE
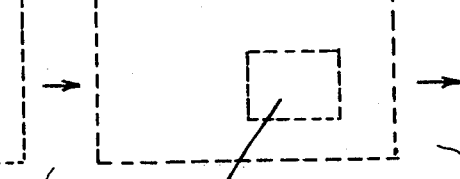
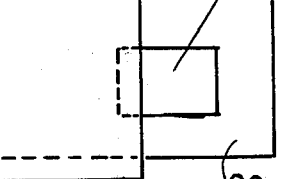
FIG. 5  CARD REGISTRATION
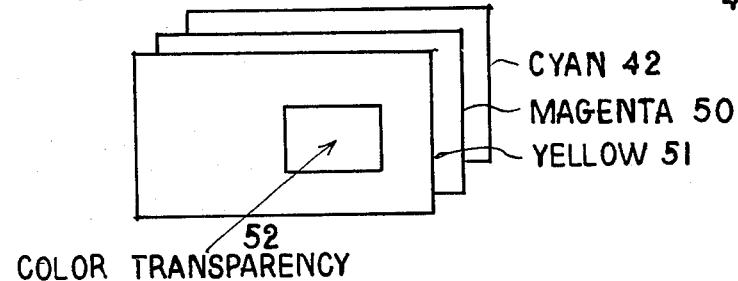

PHOSPHOR LUMINESCENT SPECTRUMS VS. DIAZO FILMS' SENSITIVITY CURVE

INSTANT COLOR SLIDE RECORDER OF CRT IMAGE

SUMMARY OF THE INVENTION

This invention relates to the instant photographic reproduction of a color or monochromatic image displayed on the face of a monitor cathode-ray tube. Reproduction of the visible monitor image in the form of a projectable slide transparency is accomplished by means of a "slave" printer cathode-ray tube.

The method of reproduction combines the arts of television and that of a well-known color-proving process, by the practical utilization of two characteristics within those arts: 1. Certain cathode-ray tube phosphors when stimulated by the electron beam of the tube emit light in the invisible ultraviolet region; and 2. Particular ultraviolet-sensitive transparent films used in the graphic arts industry for over 25 years develop the subtractive primary colors and black, as well as a variety of other colors.

From these two characteristics and of the known low ultraviolet emission of phosphors and of the low ultraviolet-sensitivity of the preferred film, which is unlike conventional, fast photographic film of high sensitivity used in cameras, this invention advances the concept of a time exposure of the film to a "still" ultraviolet image "painted" on the inner surface of the faceplate of a printer cathode-ray tube. The "still" frame image derived by well-known television techniques is repetitively projected through the printer cathode-ray tube fiber-optic faceplate onto the film in direct contact thereto for the required exposure time. A "frame grabber" is used to derive or "freeze" a frame of a moving image. It is apparent therefore that the exposure time of the film is inversely related to the intensity of ultraviolet emitted by the phosphor, the ultraviolet transmissivity of the fiber-optic faceplate, and the film's ultraviolet-sensitivity.

BACKGROUND OF THE INVENTION

It is required that this specification comply with paragraph 1.71 (b) of 37 CFR 1.1 Therefore, to distinguish the solicited patent from the present methods of instant photography, which for many applications the solicited would supplant, this will review the technical shortcomings and limited number of end applications of present methods; and the superior advantages of the solicited patent will be described.

No doubt, first thought to obtain an instant picture displayed on a cathode-ray tube is to simply focus an instant camera on the screen, but the effort for suitable results is not that simple and the result is a limited-size opaque print. Moreover, there are serious technical factors of this method which necessarily degrade the quality of any opaque picture of the displayed image. These factors are:

1. An imprecise mechanical camera shutter mechanism to "freeze" a single cathode-ray tube frame in 1/30th of a second.
2. Ambient visible light reflected by the cathode-ray tube faceplate, unless picture is taken in total darkness.
3. Halation effects between the outer and inner surfaces of the faceplate.
4. Loss of contrast ratio due to faceplate curvature.
5. Limited resolution imposed by the internal color mask.
6. Limited resolution imposed by the discrete color phosphor structure.
7. Non-linearities of vertical and horizontal sweeps.
8. Aberration of the electron beam(s).
9. The number of scanning lines per raster, depending upon sweep standard.
10. Different aspect ratios of cathode-ray tube and film.
11. Adjustment of monitor image quality by judgment of operator. (Color of this invention is in film; it is not generated by phosphor.)

Aside from the technical shortcomings inherent in the use of a Polaroid or Eastman-type instant camera to capture a cathode-ray tube image, there are desirable commercial and popular uses of pictures which those cameras do not address:

1. Instant color pictures as opaque prints are unuseable in slide projectors.
2. No instant camera of any size yields an instant color transparency for optical projection.
3. No instant camera yields black-and-white color separations of an image for use in the graphic arts industry.

The proposed process of this invention captures an instant color slide of a displayed cathode-ray tube image, not as the Polaroid/Eastman method, but by means of the video signals on the control grids of the display monitor. Simply, a "slave" ultraviolet-emitting cathode-ray tube to the monitor is used to print onto what are known in the graphic arts industry as diazo films.

Appropriate as a "slave" tube is a small, projection-type cathode-ray tube, one with a fine, continuous-phosphor ultraviolet-emitting screen on the inner surface of a fiber-optic, optically-flat, 35 mm size faceplate. Exposure of each diazo color film for a full-color transparency slide, or black-developing diazo for a separation of each color, is preferred by direct contact with the faceplate. Thus, the preferred miniature "slave" or printer cathode-ray tube would "paint" an ultraviolet image through its fiber-optic faceplate onto the diazo film, an image not degraded by the faults inherent in the Polaroid/Eastman method. And because the process of this invention utilizes ultraviolet light for exposure of the diazo films, these can be developed in ambient light. The process therefore is a "daylight" one, not requiring the use of a photographic darkroom.

Since the slow-printing, diazo films must be exposed to a still utraviolet image on the face of the printer cathode-ray tube, it is necessary, if the monitor cathode-ray tube were to display a moving picture, that there be a means to repetitively display a single frame. Therefore the preferred system would operate to enable frame storage and playback by devices known as "frame grabbers" or having the capability of "frame freezing." The playback of the "frame grabber" then would be into the printer as well as the monitor cathode-ray tube.

Following are principal reasons the use of the preferred "slave" cathode-ray tube would yield pictures superior to those obtainable either by means of instant or conventional photography of a cathode-ray tube image:

1. A small "slave" cathode-ray tube would preclude nonlinearities of vertical and horizontal deflections.
2. Electron-beam size would remain constant with its short trajectory; the ultraviolet image therefore would be "painted" uniformly.
3. The uniform powder deposit of the ultraviolet-emitting phosphor on the inner surface of the "slave"

faceplate, unlike the discrete triad phosphor pattern of the monitor cathode-ray tube, would be activated on each horizontal sweep by all video frequencies.

4. With an assumed 35 mm fiber-optic faceplate of even 20 micron fibers (plates of 7 micron fibers are manufactured), resolution of an exposed diazo image would be limited only by the resolution of the television system. With 7 micron fibers, a derived color separation would be practically continuous tone.

To teach the solicited patent "in such full, clear, concise, and exact terms as to enable any person skilled in the art or science to which the invention or discovery appertains (para. 1.71 (a), 37 CFR) . . . to make and use the same," this specification will continue with descriptions, first, of the important component elements of the printer cathode-ray tube, including its electron-gun, the preferred ultraviolet-emitting phosphor, and its fiber-optic faceplate. This will be followed by a description of the preferred film to be used for the inventive concept. Thereafter, objects of the invention will be set forth and followed by reference to drawings of a number of preferred slide recorder systems which embody the invention. This order of presentation is adopted so that a full understanding of the invention's key elements is gained in anticipation of their combination in the preferred systems.

Within the printer cathode-ray tube it is the electron gun which "paints" the video signal on the faceplate phosphor. And the intensity of ultraviolet emitted by the preferred phosphor is proportional to the beam density "projected" by the gun. Therefore, inasmuch as it is desirable that the preferred systems of this invention operate to expose the preferred film in as short a time possible, the use of an electron gun with the highest possible beam density, without loss of focus, is preferred. One such electron gun is said to be the Laminar-flo electron gun advertised by Watkins-Johnson, Palo Alto, CA. 94304. The use of the gun, or equivalent, in the printer cathode-ray tube, no doubt, would enhance phosphor ultraviolet emission.

The electron beam of the printer cathode-ray tube, as said, "paints" an image on an ultraviolet-emitting phosphor. Therefore, it is appropriate here to review a characteristic of the ultraviolet spectrum and phosphors which emit within that spectrum and their applicability to the inventive concept.

The invisible spectrum of ultraviolet is considered from 4000 to 1600 Angstrom units, and many phosphors emit ultraviolet within this region. One, P47 phosphor, for example, has an emission curve that peaks at approximately 4000 Angstrom units. Applicability of it and others to the invention, although theoretically sound, is inappropriate and practically inoperative, however, because of their low luminescent radiant efficiency. The low efficiency of conversion of electron beam power into ultraviolet emission is intolerable because it results in inordinately long times to properly expose the preferred film. This was the known phosphor "state of the art" with respect to ultraviolet emission up to the end of 1975, when announcement of a "breakthrough" phosphor, not as applicable to this inventive concept, but for X-ray screens, was published in a scientific journal.

First known mention of the "breakthrough" phosphor is believed to be in Philips Research Laboratories' publication, Medica Mundi, Vol. 20, No. 12, 1975, in a paper entitled, "New phosphors for X-ray screens," by Dr. A. L. N. Stevels. As can be readily interpreted from the paper, phosphor $BaFCl:Eu^{2+}$, the ultraviolet-emitting "breakthrough," was developed for use in X-ray screens: its substantially higher luminescent radiant efficiency under X-ray excitation would make for significantly lower X-ray doseages of patients. Dr. Stevels' paper in Medica Mundi was followed by another of his in the Journal of the Electrochemical Society, June 1976, with A. D. M. Schrama-de Pauw, paper entitled, "Theoretical and Experimental Efficiencies of X-ray Screens."

Both papers reveal the significant characteristics of phosphor $BaFCl:Eu^{2+}$, applicable not only for X-ray screens, but for use in the "slave" cathode-ray tube of the present invention. Other phosphors mentioned in both papers and considered to be significant to this invention are: $BaFBr:Eu^{2+}$, also a powder phosphor; and $CsI:Na$, a vapor-deposited phosphor. For this invention, however, and inasmuch as it has been in production for X-ray screens by GTE Sylvania since the Spring of 1977, phosphor $BaFCl:Eu^{2+}$ is immediately pertinent. Phosphor $BaFBr:Eu^{2+}$ is considered applicable despite the "afterglow" property mentioned in the Medica Mundi paper. (The afterglow is less significant than the higher luminescent radiant efficiency, since the invention is concerned with the printing of individual still images, not of a succession of frames for a moving one.)

It is appropriate to state here that Dr. A. L. N. Stevels is the son of Dr. Johannes Marinus Stevels, until recent years Chief Chemist of Philips Research Labs., Eindhoven, Netherlands.

The significant characteristics of phosphor $BaFCl:Eu^{2+}$ with respect to this invention are illustrated in FIG. 6:

1. Its emission spectrum includes the greater range of the diazo sensitivity curve (No. 5);

2. Its luminescent radiant efficiency is more than double that of P47 (No. 1), which prior to Dr. Stevels' papers was regarded by tube manufacturers in this country as the "state of the art" for ultraviolet emission.

3. The stated luminescent radiant efficiencies are measured under 20 KV cathode-ray tube excitation.

It is considered that phosphor No. 2, tentatively recommended by another phosphor chemist of Philips Laboratories may also be applicable, though its production status is unknown. The same is true of phosphor No. 4.

Here, it is now pertinent to state that the phosphor screen of the printer tube may be aluminized so that the ultraviolet light emitted by the phosphor through the fiber-optic faceplate is approximately doubled due to the reflected light of the aluminum coating. Whether or not the printer need be aluminized may well depend upon factors of image resolution and practical times of film exposure required by a particular preferred system of which the tube is a part.

It is impractical to practice this invention by the contact exposure of a diazo film against the surface of a conventional cathode-ray tube faceplate: With such a faceplate, each point of light emitted on the inner surface would disperse in all directions through the thickness of the plate, striking and exposing many points of the film—with a resulting diffuse, unsharp film image. Therefore it is appropriate to describe the preferred type of fiber-optic faceplate to practice this invention—one which will "paint" a sharp, useable image on the diazo film exposed in contact with it.

The preferred fiber-optic faceplate for the printer tube is one manufactured by such companies as Galileo Electro-Optics Corp., Sturbridge, MA., 01518; also, Canon, U.S.A., Inc., Lake Success, N.Y., 11040, and other companies. Cathode-ray tube manufacturers which produce tubes with fiber-optic faceplates include, Westinghouse Electric, Westinghouse Circle, Horseheads, N.Y., 14845; DuMont Electron Tubes, Clifton, N.J., 07015; also, Thomas Electronics, Inc., Wayne, N.J. 07470.

Of its fiber-optic plates, Galileo states in a data sheet, "... the basic function of the fiber-optic faceplate is to transfer an image into or out of a vacuum enclosure." Also, "Faceplates with high-numerical aperture and good near ultraviolet transmission characteristics are useful with ultraviolet-emitting phosphors." Galileo manufactures fiber-optic faceplates with nominal fiber diameter of 7 microns, and palte size 3-inches wide by 3-inches long by 0.2-inches thick, larger than the prefererd 35 mm size. In a cathode-ray tube, these plates withstand an accelerating voltage as high as 20 KV, which voltage, it should be observed, is that at which the luminescent radiant efficiency of the preferred ultraviolet-emitting phosphor is meaured.

Before a discussion of the characteristics of the preferred diazo films, it is in order to review briefly the two basic systems of color. Pertaining to visible light are the three primary additive colors red, green and blue. As seen on color television, when these three light primaries in appropriate proportions are combined by the eye, a sensation of white is observed. If the three primaries are added disproportionately, the white becomes tinted by the color of the predominant primary light. This additive system applied to light; it does not apply, for example, in the graphic arts to the magazine printing of color pictures, or in photography, to the processing (darkroom or instant) of opaque color prints. These involve the subtractive system of color with printing inks or dyes of colors magenta, cyan and yellow. How, then, is a color slide reproduction produced by the printer of the preferred systems with the use of films which develop the subtractive colors, when the color image on the monitor tube is observed by reason of emitted additive colors?

In explanation, the following paragraphs will describe how a red area of a scene viewed on a monitor cathode-ray tube is reproduced on a diazo film slide.

In the printer cathode-ray tube, "slave" to the monitor, the additive primary red video signal "paints" an ultraviolet image, and it is this image created by the preferred phosphor that is projected through the fiber-optic faceplate onto the diazo film. In this instance, the film in contact with the plate is one which develops the subtractive primary color cyan (bluish green). As a result, the exposed area of the film becomes desensitized, and upon development of the film in ammonia vapors the area remains transparent. The unexposed area of the film, however, turns the color cyan during development. (It should be realized that when one views a printed picture, one sees a color after incident white light has been reflected by the white paper through the printed subtractive inks or dyes.) When white light therefore is directed on the cyan film, one sees only cyan because red light has been absorbed by the film coating. When all three subtractive primary films are superimposed, it follows that the area of the cyan film exposed to ultraviolet representative of the red signal will be transparent, but the overlap of the corresponding areas of the magenta and yellow films will produce red—in the same area as shown on the monitor cathode-ray tube.

The full-color slide is produced by the development and superposition of the following three subtractive films: (1) The film which develops cyan when exposed to the ultraviolet image of the red signal; (2) The film which develops magenta after exposure to the ultraviolet image of the green signal; (3) The film which develops yellow after exposure to the ultraviolet image of the blue signal.

Thus, in the illustration above, the areas on the second and third films which correspond to the red signal area of the first film will be magenta and yellow, respectively. It remains to state that the magenta film will absorb green light from white light, and the yellow film will absorb blue light from white. The remaining unabsorbed spectrum will be red—corresponding to the original red area. By a similar analysis all visible colors of the spectrum can be reproduced by the films.

Now to consider the ultraviolet-sensitive films preferred for this invention; they are known as diazo films, and have maximum sensitivity in the ultraviolet spectrum between 3600 and 4000 Angstrom units. They develop the three subtractive primary colors magenta, cyan and yellow and black, and a number of other colors, by exposure to ammonia vapors.

The films have been in common use in the graphic arts industry for over 25 years, generally to color proof separations produced by conventional photographic methods. For that useage, the low sensitivity of the films to ultraviolet light is tolerable because the films are exposed through the photographic separations either by means of high-intensity arc lamps or mercury-vapor lamps, both rich in ultraviolet. In that useage the low sensitivity of the films is offset by the high ultraviolet emission of the lamps.

In this invention a short exposure time of the diazo films requires the highest possible phosphor emission of ultraviolet through the faceplate of the printer cathode-ray tube. It will be realized at this point that the diazo films have never been used, nor can they be, in a conventional camera with film exposures in fractions of a second. The preferred diazo films, and others applicable to the inventive concept, require exposure times in the order of seconds. It is appropriate here to cite first the manufacturers of the preferred ammonia-developing diazo films; they include the Ozalid Division of GAF; Tecnifax, a division of Scott Paper Company; Keuffel & Esser Company, and others. It is probable, too, that the preferred films are manufactured worldwide, whereas other applicable films are not because of their proprietary nature.

Other films applicable to the inventive concept, by reason of their sensitivity to the ultraviolet spectrum, are the Color Key films of the 3-M Company. These films have been on the market for approximately 15 years and are developed by solution. They are available in the process colors cyan, magenta, yellow and black.

The third color-proofing system available to the graphic arts industry, and applicable as well to the inventive concept, is the "Chromalin" system of the Du Pont Company. The system of ultraviolet-sensitive films was introduced in 1972 and makes use of dry toners or powders of the subtractive primary colors, as well as a range of other colors, to develop the color of each separation.

Still another available ultraviolet-sensitive film applicable to the inventive concept, not for the production of color slides, but for black-and-white color separations is the heat-developing film Kalvar, marketed by Canon, U.S.A., as the Canon/Kalvar System.

Having described the basic inventive concept, the several means to implement the concept and pertinent color theory, the applicant here respectfully sets forth the objects of his invention.

OBJECTS OF THE INVENTION

In its broadest aspect, the object of the invention is to provide a simplified daylight means for the instant reproduction in permanent transparency form (hard copy) of any image displayed on the face of a monitor cathode-ray tube, including natural, full-color pictures, pseudo-color images, computer graphics, color graphics, black-and-white and the like—wherever and whatever the source of image generation.

A corollary object is to provide for the instant daylight reproduction in film transparency form of a displayed image which has been prerecorded on magnetic tape, video disk or other means of video storage.

Another corollary object is to provide for the instant daylight reproduction in film transparency form of a displayed color graphic image generated by the interface of input devices and a color graphics computer.

Another corollary object is to provide for the instant daylight reproduction in film transparency form of a displayed pseudo-color image whose preprocessed origin of video signal is the output of a black-and-white television camera.

Another corollary object is to provide for the instant daylight reproduction in film transparency form of a displayed psuedo-color image whose origin of generation is a type of scanner with data acquisition means interfacing an image computer.

Still another corollary object is to provide for the instant daylight reproduction in film transparency form of a displayed image whose origin of generation is a facsimile color scanner.

Another corollary object is to provide for the instant daylight reproduction in film transparency form of a displayed image whose origin of generation is a flying-spot scanner.

Another corollary object is to provide for the instant daylight reproduction in film transparency form of a displayed image whose origin of generation is a CBS-type color-wheel camera.

Still another corollary object is to provide for the instant daylight reproduction in film transparency form of an image displayed on the cathode-ray tube of a television receiver.

Another object is to provide for the instant daylight reproduction of black-and-white color separation films, in lieu of subtractive color separation films printed by the foregoing inventive objects.

The particular objects and features of this invention, and other objects and features ancillary thereto, will be more clearly understood from a reading of the following description in conjunction with the accompanying drawings, showing, by way of example, preferred embodiments of the inventive idea. The text in explanation of FIGS. 2 through 6, it will be realized, is applicable not only to the system in FIG. 1, but also to systems illustrated in FIGS. 7 through 13.

FIG. 1 is a system embodiment of the invention.
FIG. 2 illustrates preferred film formats.
FIG. 3 illustrates diagrammatically an exposure sequence of the preferred films.
FIG. 4 depicts a developing sequence of the preferred film through a developing tank.
FIG. 5 illustrates the registration of the developed films in the composition of a color picture.
FIG. 6 illustrates with four curves a number of phosphor luminescent spectrums vs. diazo films' sensitivity curve.
FIG. 7 is a second system embodiment of the invention.
FIG. 8 is a third system embodiment of the invention.
FIG. 9 is a fourth system embodiment of the invention.
FIG. 10 is a fifth system embodiment of the invention.
FIG. 11 is a sixth system embodiment of the invention.
FIG. 12 is a seventh system embodiment of the invention.
FIG. 13 is an eighth system embodiment of the invention.

DETAILED DESCRIPTION OF THE DRAWINGS

Figure 6:
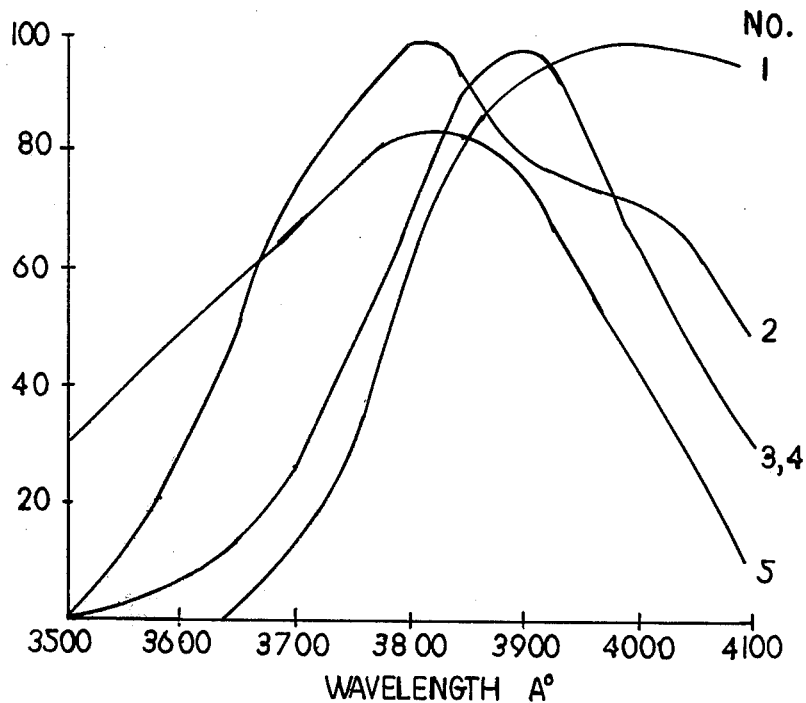

Referring to the system of FIG. 1, the video magnetic tape recorder/play or disk play device 10 may be also any other video storage means. This invention conceives that the output color signals of the storage means on lines 11, 12 and 13, as inputs into color monitor cathode-ray tube 19, may also be terminated on switch 14.

By manipulation of switch 14 to each of its three positions, the video signals on lines 11, 12 and 13, red, green and blue, respectively, can be input singly to electron gun 16 of cathode-ray tube 15 for as long as required exposure time of the film to be printed. When switch 14 is closed to line 11, the input to electron gun 16 of printer tube 15 is of the red video separation signal of the color image on the screen of monitor tube 19. Callout 17 is the preferred ultraviolet-emitting phosphor, as has been described. Number 18 refers to the fiber-optic faceplate of printer tube 15. In conclusion of system operation, a cyan film in contact with faceplate 18 is exposed to the ultraviolet image of the red separation signal on line 11; a magenta film in contact with faceplate 18 is exposed to the ultraviolet image of the green separation signal on line 12; and a yellow film in contact with faceplate 18 is exposed to the ultraviolet image of the blue separation signal on line 13.

The preferred formats of the diazo films exposed in contact with faceplate 18 are described in FIG. 2. FIG. 3 illustrates an exposure sequence; FIG. 4, a developing sequence; and FIG. 5, the registration of three color films to produce a color transparency.

Figure 9:
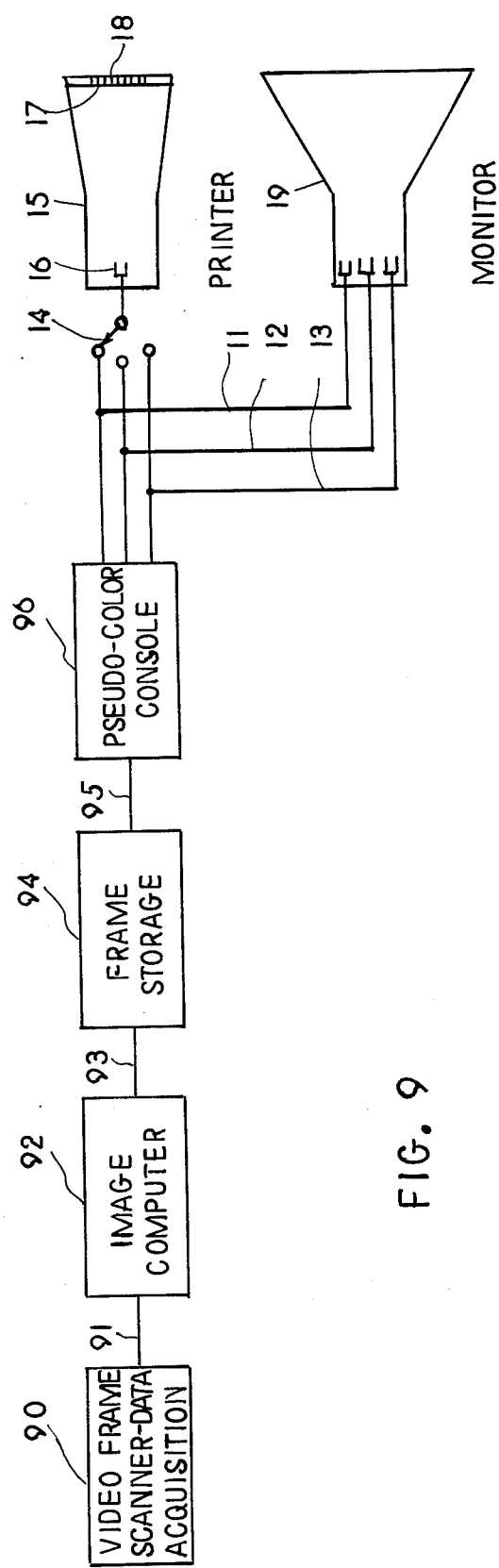
Figure 10:
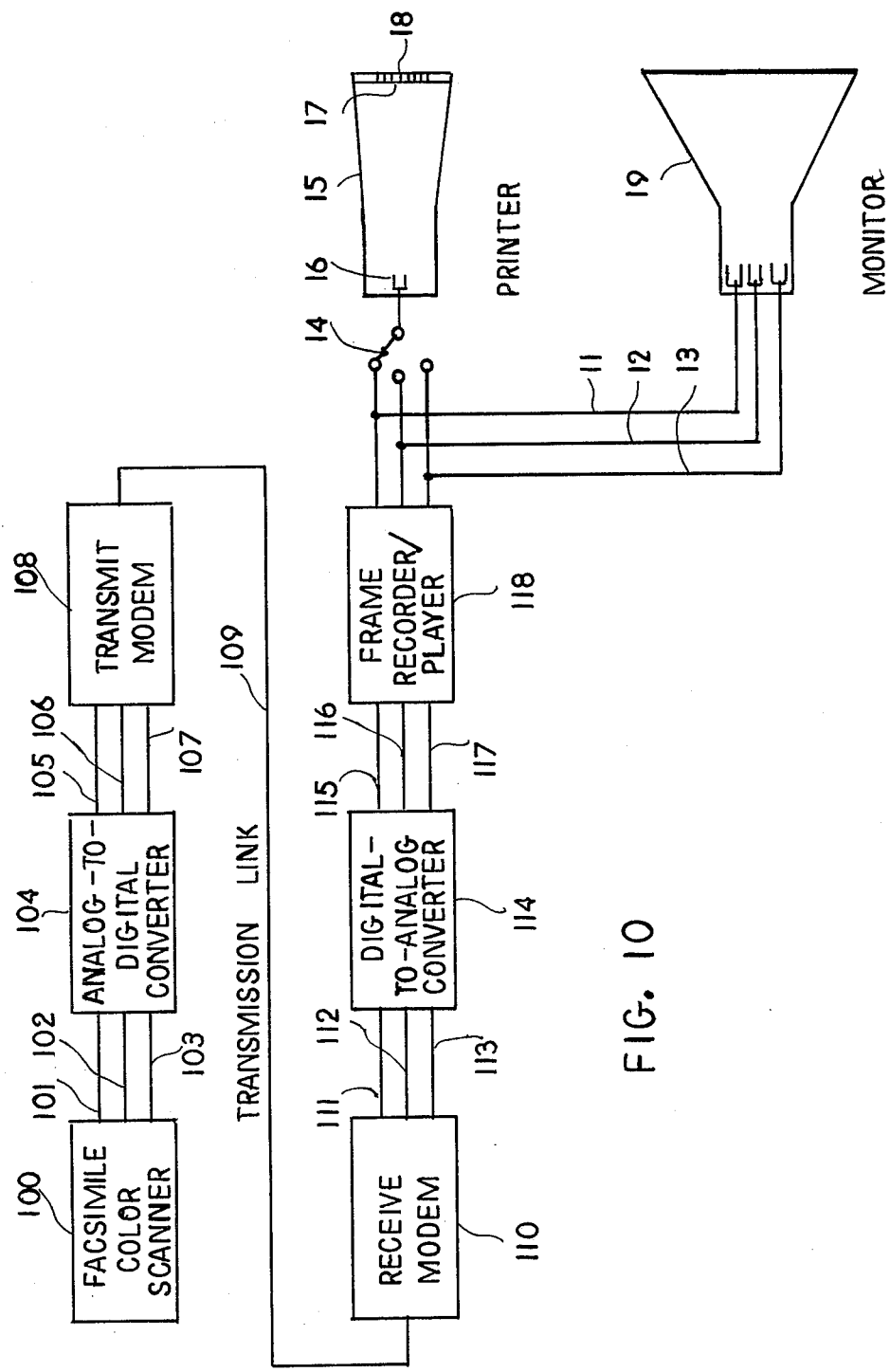
Figure 11:
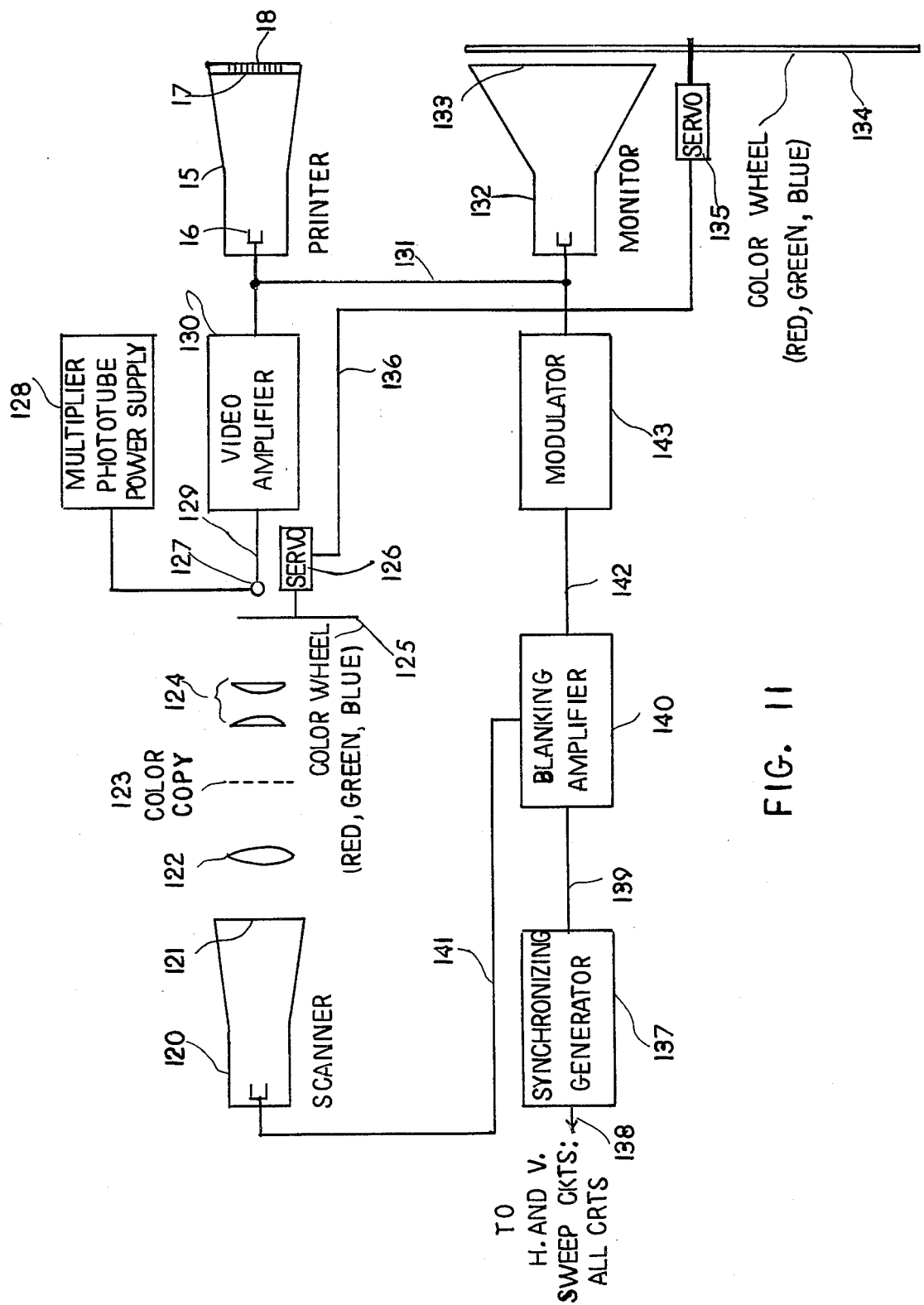

It is anticipated that the foregoing two paragraphs are applicable not only to the preferred system of FIG. 1, but also in whole to the preferred system embodiments of FIGS. 7, 8, 9, 10, 12 and 13; less operation of switch 14, the paragraph descriptions apply as well to the preferred system embodiment of FIG. 11.

FIG. 2 illustrates preferred formats of the diazo film to be placed in contact with fiber-optic faceplate 18 of printer cathode-ray tube 15. Number 20 is an aperture card with diazo film insert 21; number 22 is a slide format with diazo film insert 23. When the exposure of only one card 20 or slide 22 is involved, then registration of several of each after development is of no consideration. Both pseudo- and color cards or slides however require that each of the three color separation films be in precise register when superimposed; they require therefore that each subtractive film, magenta, cyan and yellow, be positioned on the faceplate 18 in the same pecise position for their respective exposures. It follows, then, that the exact positional exposure of each of the three films will yield the desired quality without overlap or misregistration of colors.

To achieve the desired precise registration, and for ample room to identify a film subject, this invention prefers that the color diazo films be mounted in aperture cards. The advantages of aperture cards need not be described because of their wide useage throughout govenment and industry. Manufacturers of the cards include 3-M Co., Microseal Corporation and others.

It is important to realize, by way of background, that the film in commonly-used aperture cards are either of high visible-light sensitivity (silver emulsion) or of low ultraviolet-light sensitivity (diazo emulsion). The former film is used for high volume production of, for example, black-and-white aperture cards of thousands of line drawings, while cards with the latter are used most often to duplicate the former. There ae no known aperture cards with high-sensitivity color film inserts. Also, there is no known aperture card manufactured with color diazo film inserts.

When there is no need for identification of a desired picture subject, then the format of the diazo films could be as a 35 mm insert in a 2×2 inch slide frame, similar to a photographic slide for optical projection.

FIG. 3 indicates a sequence of three aperture cards 20 with films 32, 31 and 30, cyan, magenta and yellow, respectively, being exposed by printer 15 in that order. The order however is arbitrary for the figure.

This invention considers that the transport of cards or slides from left to right, or otherwise, be mechanized, much as IBM cards are transported by various equipments used in the computer industry. In this instance, each card or slide would be stopped precisely in position so that the diazo film insert can be pressed by a pressure plate against the fiber-optic faceplate 18 of printer tube 15.

The design of the mechanism (not shown) to press each unexposed diazo card or slide film against fiber-optic faceplate 18 is considered important. It is obvious, of course, that the pressure-plate mechanism operate so that each card or slide is pressed against the faceplate in precisely the same position, so that there can be precise registration of the developed cards or slides. The pressure plate, it is preferred, would have a reflective surface, so that the ultraviolet image generated by phosphor 17 and "painted" through fiber-optic faceplate 18 onto the diazo film is reflected back through the film, through faceplate 18 and ultraviolet-emitting phosphor 17, and again be reflected, this time by the aluminum backing to the phosphor if printer tube 15 is aluminized. This diazo film "sandwich" between the suggested two reflective surfaces, no doubt, will significantly reduce the exposure time of the film.

After exposure of a card or slide by printer cathode-ray tube 15, the next step is development of the film inserts. FIG. 4 illustrates an arbitrary developing sequence of aperture cards 20 through developing tank 43, in which ammonia vapors 44 actually develop the diazo films. Number 42 refers to an already developed cyan diazo film; number 41, to a developing magenta film; while number 40 refers to an exposed but yet undeveloped yellow diazo film.

Pertinent is the fact that diazo film processors are readily available in the microfilm industry. A few manufacturers of same include Blu-Ray, Inc., Essex, Conn.; the Micobra Corp., Hanover, Mass.; GAF Corp., New York, N.Y. The films are developed by exposure to the vapors of commercial aqua-amonia (26° Baume). A market product Diazol claims to virtually deodorize or mask the ammonia odor.

FIG. 5 illustrates the registration of the developed aperture cards, cyan 42, magenta 50 and yellow 51 to form color transparency 52. Without laboring the subject, it is deemed apparent that when three color diazo aperture cards 20, for example, are precisely positioned and exposed against fiber-optic faceplate 18, their subsequent registration after development is achieved by simply "squaring" the three as one might a deck of playing cards.

With regard to aperture card readers and slide projectors of assembled cards or slides for optical enlargement, these equipments are readily available. Manufacturers include the 3-M Company; Realist, Inc., Menomonee Falls, Wisc.; and Micro Information Systems, Inc., Atlanta, Ga. Many companies market both film processors and readers.

FIG. 6 is a key illustration. It depicts curves of the luminescent spectrums of four phosphors and their respective luminescent radiant efficiencies vs. a representative curve of the ultraviolet sensitivity of the preferred diazo films magenta, cyan, yellow and black. The legend of the figure lists as well the chemical formula of each phosphor and a "P" number, as applicable. Reference is made to a Philips Research Report in authentication of the preferred phosphor formula and luminescent radiant efficiency. The diazo sensitivity curve was secured from Teledyne-Post Company, manufacturers of diazo films.

It is pertinent to state here that a major manufacturer of cathode-ray tubes with fiber-optic faceplates, using a P47 phosphor, believed by it to be the "stae-of-the-art," has calculated full time exposure of a diazo film to be approximately 95 seconds. Calculations are based upon the film requirements of about 200 millijoules/cm$^2$ for full exposure, a number furnished to it by GAF and Scott Graphics for their diazo films. The manufacturer's response reads, "With a fiber optic (N.A.=1.0) CRT operating at 20 KV and 50 microamps beam current into a 0.0025" wide line, the writing speed using P47 phosphor would be about 15 cm/sec.; filling a 35 mm frame (400 lines) would take about 95 seconds."

With particular regard to phosphor No. 3 of the figure, $BaFCl:Eu^{2+}$, this is the subject of GTE Sylvania phosphors Technical Information Bulletin for Type 2630, Barium Fluorochloride, Europium; bulletin CM-763 (6/76). It is noteworthy that the bulletin states: "Application . . . X-ray Intensifier Screen." Address of GTE Sylvania is: Precision Materials Group/Chemical & Metallurgical Division, Towanda, Pa.

Figure 7:
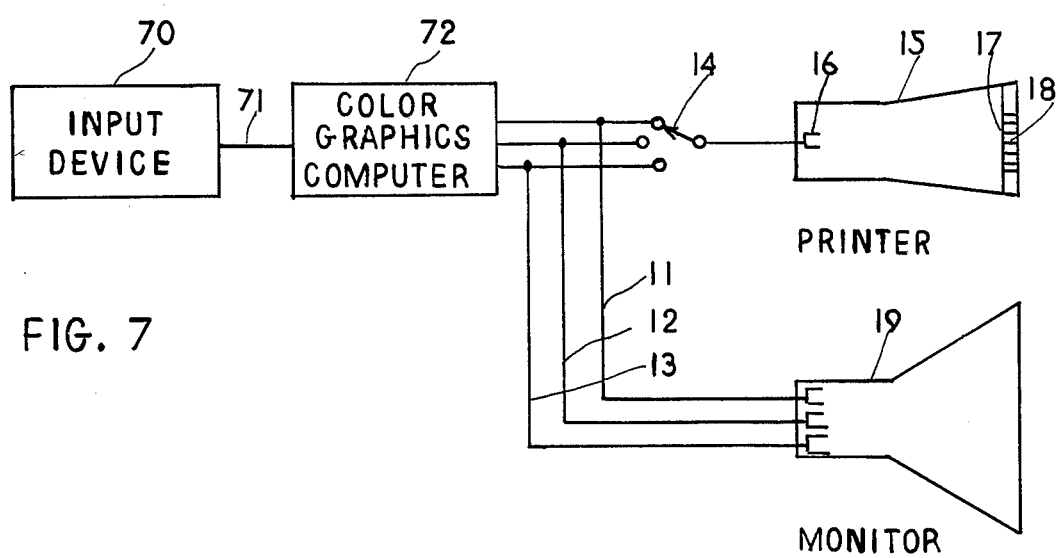

FIG. 7 is a block diagram of a color graphics computer system which embodies the inventive concept. Input device 70 may be one or more input means into color graphics computer 72 via line 70. Device 70, for example, might be a keyboard, a joystick, tracking ball, data tablet, etc. A function of color graphics computer 72 is to assign selected colors to the computed image appearing on the screen of color monitor cathode-ray tube 19. All colors on the screen of monitor 19 are seen as the visual integration of proportions of the additive lights red, green and blue emitted by the phosphors of color monitor 19 when excited by respective electron beams modulated by the color separation signals on lines 11, 12 and 13. Printing of a color card or slide of the image on monitor tube 19 is by manipulation of switch 14 in the manner described for system No. 1.

Companies today that manufacture color graphics computers include Genisco Technology Corp., Irvine, CA, 92714; De Anza Systems, Inc., San Jose, CA, 95131; Chromatics, Inc., Atlanta, GA., 30340; Apple Computer, Inc., Cupertine, CA., 95014; and others.

Figure 8:
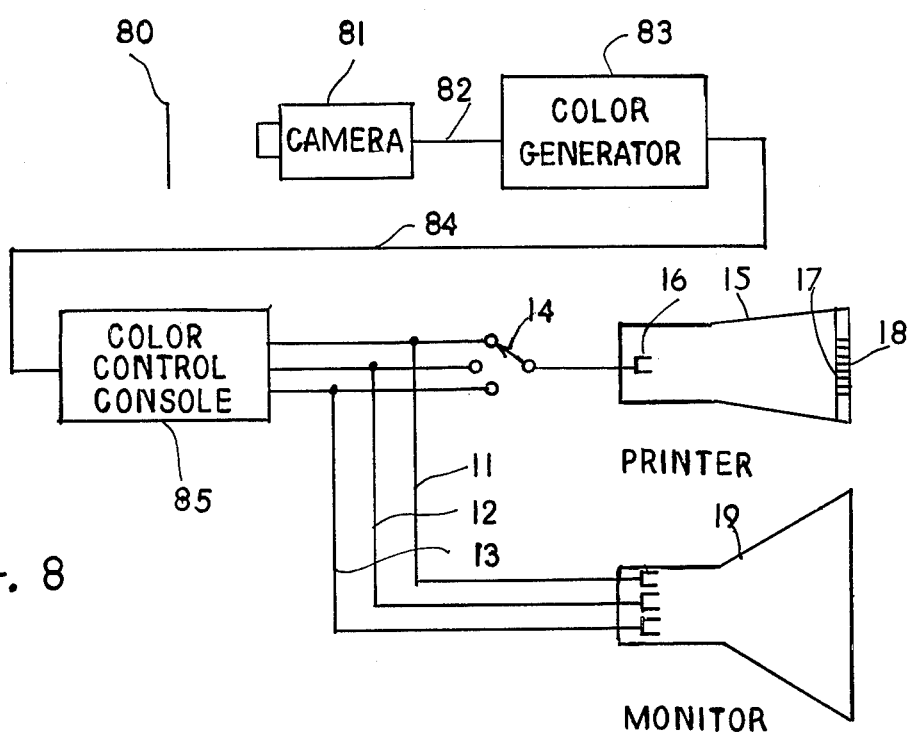

FIG. 8 illustrates a system of electronic color simulation to which the inventive concept is applicable. Number 80 refers to an object of grey-tone art, and number 81 to a monochrome television camera. The output of camera 81 over line 82 to color generator 83 is a video signal representing the grey tones of art 80. It is the function of color generator 83, as an analog-to-digital converter, to digitally tag each shade of grey of the camera output and to forward the digitized video signal over line 84 to color control console 85. Color control console 85 operates to very appropriate proportions of additive colors red, green and blue for each grey tone—as can be monitored on monitor cathode-ray tube 19. As is evident in FIG. 8, the outputs of color control console 85 on lines 11, 12 and 13 are the red, green and blue video signals, respectively, into monitor tube 19, and terminating also on positions of switch 14. Printing of a color card or slide of the image on monitor 19 is by manipulation of switch 14 in the manner described for system No. 1.

A company which manufactures a type of electronic color simulator is Spatial Data Systems, Inc., Goleta, CA., 93017.

FIG. 9 is a block diagram of a pseudo-color image system to which the inventive concept is applicable.

Today, there are numerous types of image scanners in all fields of human activity. For example, in the field of medicine, there are scanners for: 1. Computerized Axial Tomography; 2. Nuclearography; 3. Thermography; 4. Ultrasonography. Moreover, there are many types of industrial and scientific scanners, too numerous to mention. In fact, to realize in small part the number of scanners today and the applications of pseudo color, it is necessary only to refer to the article "Wondrous Eyes of Science," in the March, 1978, issue of National Geographic magazine.

FIG. 9 refers in particular to a digital electronic system which displays a digital image constructed by a computer. Video frame scanner-data acquisition block 90 represents any of the aforementioned scanners, the output of which in the form of picture elements (pixels) is fed into image computer 92. It is the purpose of computer 92, in general, to assemble the pixels it receives from scanner 90 into a complete picture.

None of the scanners represented, it should be realized, separate the object scanned into component color signals; rather, each scanner serves to record the particular physical property for which it was designed. As for example, in medicine, the Computerized Axial Tomography (CAT) scanner system constructs X-ray images; the Nuclearography system, gamma-ray images; the Thermography system, heat images, etc. In no instance does the scanner process a signal representative of a color per se, but rather one representative of a reflective, or absorptive, or emissive property of the object scanned. Therefore, the image signal is said to be monochromatic—but its shades of grey, as digital numbers, are assignable as display colors.

Assignment of a selectable color in lieu of a shade of grey on a color cathode-ray tube is a technique that has developed over the last 10 years and is now gaining wide acceptance in the field of computer graphic displays, which until 1977 were primarily black-and-white. Thus, the accepted term, "pseudo-color." (That a color display conveys more information, more readily understandable, is being realized in all fields as technical barriers are being overcome.)

Returning to FIG. 9, the image assembled by image computer 92 is forwarded on line 93 and stored in frame storage 94, which makes possible the repetitive playback of the stored frame. Playback of the stored frame by storage unit 94 is via line 95, through pseudo-color console 96, to monitor tube 19. It is the function of pseudo-color console 96 to assign a selectable color to each discrete shade of grey (digital number) as desired. In a simplified explanation, then, each console-selected color is translated as percentages of red, green and blue signal levels at the outputs of console 96, on lines 11, 12 and 13. The colors are displayed on monitor tube 19, and the printing of a color aperture card or slide of that display is by manipulation of switch 14 in the manner described for system No. 1.

FIG. 10 is a block diagram of a color facsimile system with the inventive concept. Facsimile color scanner 100 is a scanner capable of resolving either transparent or opaque color copy into video signals representative of primary color separations red, green and blue on lines 101, 102 and 103, respectively. The function of analog-to-digital converter 104 is to digitize each analog color separation and forward all three, again respectively, on lines 105, 106 and 107 to transmit modem 108. Transmit modem 108, in turn, modulates appropriate carrier signals(s) by the now digital color separations and transmits the separations via transmission link 109 to receive modem 110. Transmission link 109 may be a telephone line.

Receive modem 110 operates to derive the digital color separations from the carrier signal(s) and forward one each separation on lines 111, 112 and 113 (red, green and blue, respectively) to digital-to-analog converter 114. This converts each of the digital color separations on lines 111, 112 and 113 into analog color separations on lines 115, 116 and 117, similar to those on lines 101, 102 and 103. Thereafter, the separation signals on lines 115, 116 and 117 are applied to frame recorder/player 118, which operates to record each signal at a rate synchronous with facsimile color scanner 100. In the playback mode, frame recorder/player 118 plays back the recorded separation signals onto lines 11, 12 and 13, into color monitor 19 at a rate of 30 frames/second. Printing of a color aperture card or slide of the image on monitor cathode-ray tube 19 is by manipulation of switch 14 in the manner described for system No. 1.

FIG. 11, a flying-spot scanner embodiment of the inventive concept, indicates the use of three cathode-ray tubes 120, 15 and 132. Scanner cathode-ray tube 120 contains phosphor screen 121, which emits white light when excited by the electron beam; printer tube 15 contains phosphor screen 17, which emits ultraviolet light when excited by the electron beam, and screen 133 of monitor tube 132 emits white light. Preferably, all three cathode-ray tubes be of the highest possible resolution types in design of electron optics and phosphor screen.

With reference to FIG. 11, synchronizing generator 137 serves as a timing source to synchronize the vertical and horizontal sweep circuits of all three cathode-ray tubes. In addition to timing, the synchronizing generator 137 also supplies blanking signals over line 139 to blanking amplifier 140. This, in turn supplies blanking signals over line 141 to scanner 120, and over line 142 to modulator 143, thence to the electron gun of printer tube 15 and the gun of monitor tube 132.

In operation, color copy 123 is placed in line with lens system 122 and 124 before phosphor screen 121. Light filter 125 (red, green or blue), which might be a small color wheel, is placed, as indicated in front of phototube 127, supplied with power by power supply 128.

Projected by lens system 122 and 124, the unmodulated white light raster emitted by phosphor screen 121 is modulated by color copy 123. Light filter 125 (red, for example) allows only the red component of light through color copy 123 to fall on phototube 127, and its video output voltage, therefore, is representative of only that component of white light. The video output is amplified by video amplifier 130, after which the blanking signals from blanking amplifier 140 are added to it by modulator 143. Thereafter, the composite video signal is applied to both printer cathode-ray tube 15 and to monitor tube 132 to modulate their electron beams. In this manner, the modulated electron beam of printer tube 15, "slave" to monitor tube 132, "paints" on phosphor screen 17 an ultraviolet image representative of the red component of color copy 123. Through the fiber-optic faceplate 18, therefore, the ultraviolet image of the red separation exposes the proper diazo film, in this instance, the film which develops cyan.

In like manner, light filter 125 may be green, in which case the diazo film which develops magenta would be exposed to the ultraviolet image emitted by phosphor screen 17. With a blue light filter 125, the diazo film which develops yellow would be exposed to the ultraviolet image emitted by phosphor screen 17.

The modulation of the electron beam of monitor 132 by the composite signal of video and blanking in effect "paints" on screen 133 a white image of the red separation of color copy 123. However, this is viewable as the red separation simply by placing a red light filter in front of monitor 132. Thereby, it is possible to visually monitor the quality of the color separation being printed by printer tube 15. In practice, it is deemed practical that light filter 125 actually be a segmented color wheel (red, green, blue) driven by a servo motor electrically connected to a second servo which drives a larger segmented color wheel in front of monitor tube 132. Thus, with the relative angular positions of the two color wheels alike, the color segment of wheel 134 in front of monitor 132 will be the same as in front of phototube 127. Printing of each color separation viewed on the screen 133 of monitor 132 is accomplished by printer tube 15 as has been described.

Figure 12:
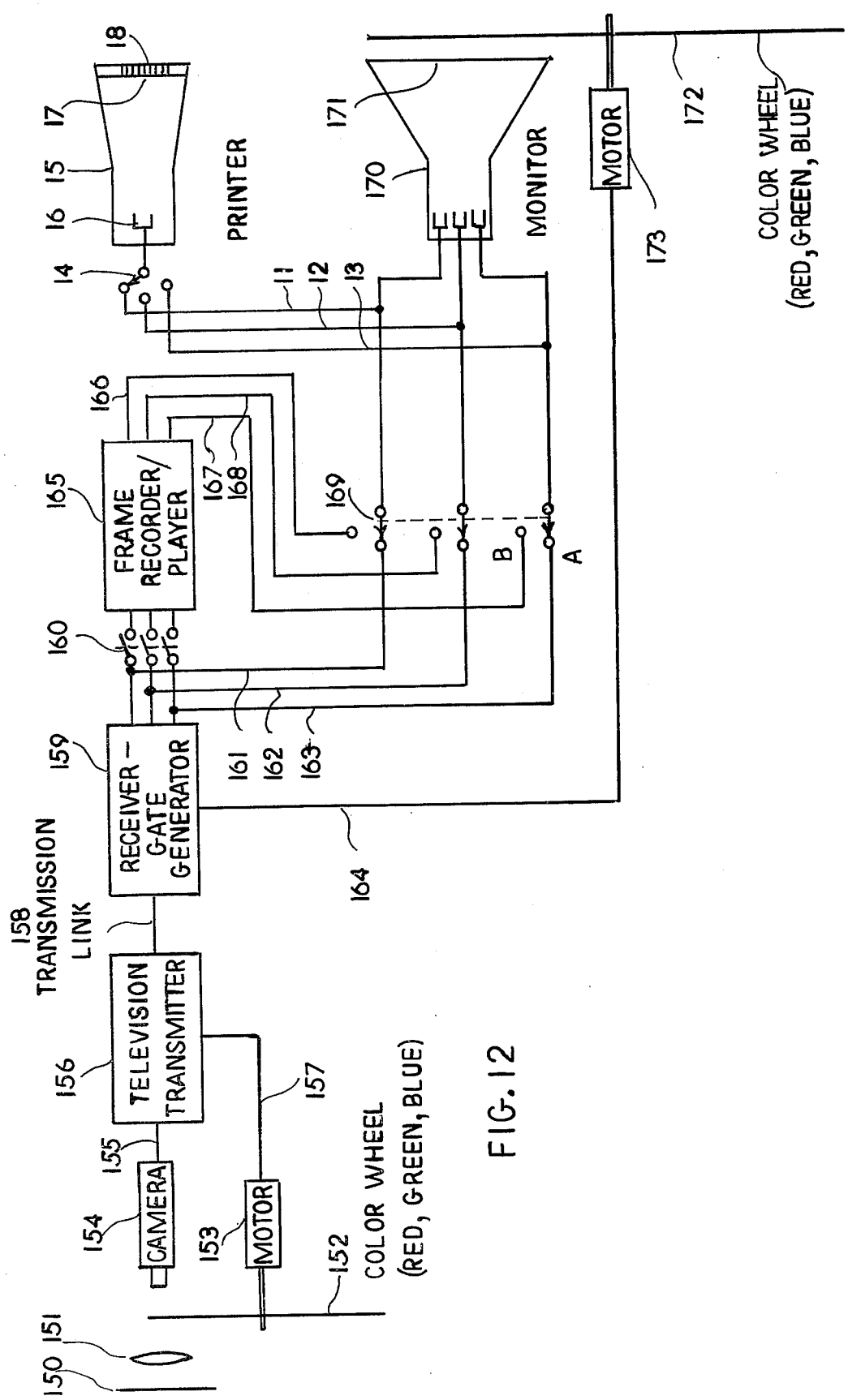

FIG. 12 is yet another system to which the inventive concept is applicable. It is a "CBS-type" color-wheel television system. The system makes use of a color wheel 152 in front of black-and-white television camera 154. The camera of this system has an output of serial color fields, and the system is considered a field sequential method of scanning the primary additive colors. So that a complete color frame is displayed on monitor tube 170 in 1/30th of a second, the system utilizes motor 153 to rotate red-green-blue segmented color wheel 152 in front of camera 154 at such a speed as to provide signal outputs of 60 red, 60 green and 60 blue fields (total of 180) per second; or 30 red, 30 green and 30 blue frames (total of 90) per second; therefore, one whole frame of all three colors is displayed in 1/30th second. The sequence of signal fields representing the red, green and blue color separations appear at the output of camera 154 and are then fed serially in sequence to television transmitter 156.

From television transmitter 156, the video signals of the color fields are forwarded over transmission link 156 to receiver-gate generator 159 in which they are processed. The gate generator section of receiver-gate generator 159, functioning like a distributor, is synchronized to motor 153 by way of a sync signal on line 159 from motor 153 to transmitter 156, and therefore to the speed of rotation of segmented color wheel 152. Synchronized in this manner, the gate generator section functions to distribute the video signals representing each of the color separation fields to respective output lines 161, 162 and 163 (i.e., video signals of the red field appear on line 162 when the red filter segment of color wheel 152 is in front of camera 154; the signals of the green field appear on line 162 when the green segment is in front of the camera; signals of the blue field appear on line 163 when the blue segment is in front of the camera). In the course of processing the transmitted video signals, receiver-gate generator 159 also recovers the motor synchronizing signal on line 157 transmitted by transmitter 156. Out of receiver-gate generator 159, the synchronizing signal is forwarded to motor 173, the speed of rotation of which is synchronized thereby to that of motor 153. Therefore, when the red color segment of color wheel 152 may be in front of camera 154, the red color segment of color wheel 172 is in front of monitor 170.

With switch 169 connected to lines 161, 162 and 163 (A position), then the red, green and blue fields distributed by the gate generator section of receiver-gate generator 159 will be applied in sequence to respective electron guns inside monitor tube 170. Since the faceplate of monitor 170 is coated with white light-emitting phosphor 171, when a red signal frame of two fields excites phosphor 171 and the red color segment of color wheel 172 is in front of monitor 170 for each field, then the red separation of scene 150 will be displayed. Similarly, the green and blue separations will be displayed in sequence. Inasmuch as monitor 170 displays a rotational sequence of 90 (30 red, 30 green and 30 blue) frames per second, the eye will observe a full-color moving image of scene 150 if this is animate; it is not then possible to operate printer tube 15 to reproduce a moving image. If scene 150, however, is inanimate, then it is possible to print a transparency reproduction of the image on monitor tube 170.

If a moving image is observed on screen 171 of monitor 170 and it is desired to print a slide of a particular scene, this can be accomplished by operation of ganged-switch 160. Momentary closure of the switch for 1/30th of a second to the inputs of frame recorder/player 165 places a single color frame in storage in frame recorder/player 165. When recorder 165 is placed in playback mode, the video signal of all three color separation frames red, green and blue are read out onto lines 166, 167 and 168, respectively, the lines terminated on the "B" positions of switch 169. With switch 169 in the "B" position, the color separation frames on lines 166, 167 and 168 are applied to the three electron guns, respectively, of monitor tube 170, and also to respective positions on switch 14. The frame playback rate of frame recorder/player 165 is at 30 full color frames/sec.; therefore all display fields and frames are synchronized with the rotation of color wheel 172. Printing of a color aperture card or slide of the image on monitor 19 is by manipulation of switch 14 in the manner described for system No. 1.

Figure 13:
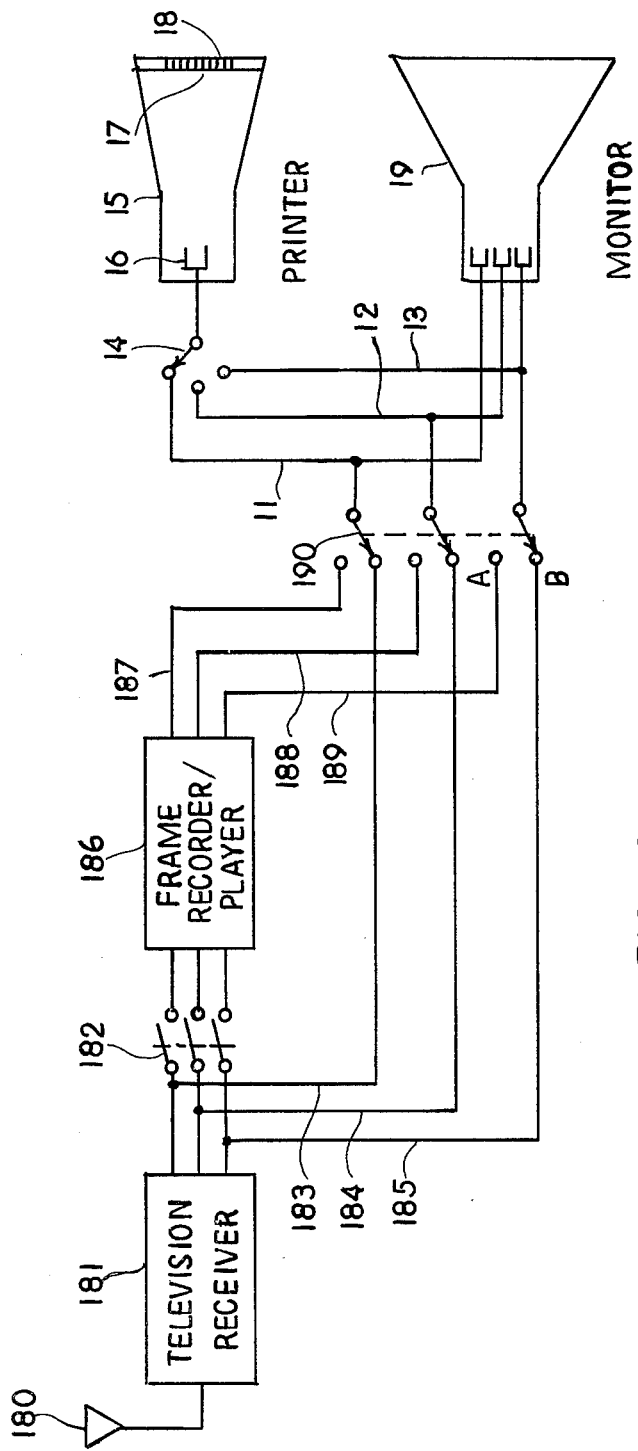

FIG. 13 represents the receiving portion of an open-circuit NTSC system embodying the inventive concept. The description assumes that a color signal of an animate scene is received by antenna 180 and processed by color television receiver 181. Furthermore, it is desired to reproduce as a slide a selected frame of the moving image displayed on monitor 19. The video output voltages of receiver 181 appear on lines 183, 184 and 185 and represent the red, green and blue color separation components, respectively, of the received scene. With switch 190 in the "B" position, as shown, closed to lines 183, 184 and 185, all three color components appear on the electron guns of monitor cathode-ray tube 19, a conventional color televison tube; and the tube therefore displays a moving image.

To reproduce a slide of one frame of the moving image, it is first necessary to operate momentarily for 1/30th second switch 182 to close to the three inputs of frame recorder/player 186, which then stores the selected frame as viewed on monitor 19. In order to display the still image on monitor 19, rather than the animate image, switch 190 is operated to its "A" position and frame recorder/player is placed in its playback mode. The color separation signals are then output on lines 187, 188 and 189, through switch 190, to monitor tube 19 and to positions of switch 14. Printing of a color aperture card or slide of the image on monitor 19 is by manipulation of switch 14 in the manner described for system No. 1.

If the studio broadcast is of a still picture, then monitor 19 naturally would display a motionless full-color still, and if it remained for a suitable length of time it would be possible to print a slide of it by manipulation of switch 14 as described.

Although switches of a mechanical nature are shown and described herein, it is to be understood that electronic switching means could be employed as well for accomplishing the same purpose. Mechanical switching has been shown merely in order to simplify the drawings and explanations thereof and in order to present readily a complete and understandable description of the systems.

For example, manipulation of switch 14, is described to teach how each color-separation video signal is impressed on the ultraviolet-emitting printer cathode-ray tube. Well known in the electronic art, however, are the means to mix several input signals. Thus the preferred systems may include mixing networks before the printer tube in order to blend two or more color separation video signals from two or more sources, and to print a montage or composite image on a diazo film. All the techniques of commercial television may be applied.

Furthermore, the printer tubes of the preferred systems need not be operated to make color transparencies directly, rather operated to print sets of black-and-white color separations of the monitor image. In this instance, instead of exposing each subtractive primary diazo film to its respective ultraviolet image emitted by the printer tube, a diazo film which develop black may be used for each exposure. Development of each film will yield a black-and-white color separation which, in turn, may be used to print on the respective subtractive film to obtain a color proof of the separations. Also, each black-and-white color separation may be enlarged by an ultraviolet projector, or projected onto respective color films, or onto offset printing plates for color printing press reproduction of the monitor image.

Furthermore, it should be appreciated that operation of printer tube 14 is in no way restricted to use with the preferred systems. These systems per se operated to present to the monitor, and therefore to the printer tube, signals representative of either natural or pseudo colors. But appreciation in depth of the inventive concept will bring the realization that the repetitive playback of any signal into the printer tube makes possible the printing of that signal in black-and-white and/or color. Desirable high resolution black-and-white displays therefore can be reproduced as diazo color slides with the available ten or more diazo color films.

Various other alterations and modifications of the present invention may become apparent to those skilled in the art, and it is desirable that any and all such modifications and alternations be considered within the purview of the present invention except as limited by the hereinafter appended claims.

I claim:

1. An instant "daylight" system of recording a hard-copy film reproduction of any still image displayed on the faceplate of a cathode-ray tube, comprising a monitor cathode-ray tube with a visible display of a still image, means to apply to a second cathode-ray tube the same video signal(s) as applied to said first monitor cathode-ray tube, said second cathode-ray tube with electron-gun means for optimum electron-beam density and with optimum ultraviolet-emitting phosphor means deposited on a fiber-optic faceplate means having optimum ultraviolet-transmissivity, and ultraviolet-sensitive film means exposed in direct contact with said faceplate means.

2. An instant "daylight" system of recording a hard-copy film reproduction of a still cathode-ray tube monitor image, comprising an image storage means with a still playback capability, a cathode-ray tube image-monitor means to display the still image output of said storage means, a switching means to direct individually color components of the monitor image into a cathode-ray tube image-printer means with electron-gun means for optimum electron-beam density and with optimum ultraviolet-emitting phosphor means deposited on its fiber-optic faceplate means, and ultraviolet-sensitive film means exposed in direct contact with said faceplate means.

3. An instant "daylight" system of recording a hard-copy film reproduction of a still cathode-ray tube monitor image, comprising an input means to change the outputs of a color graphics computer means, said outputs displayed on a cathode-ray tube image-monitor means, a switching means to direct individually the color components of said monitor image into a cathode-ray tube image-printer means with electron-gun means for optimum electron-beam density and with optimum ultraviolet-emitting phosphor means deposited on its fiber-optic faceplate means, and ultraviolet-sensitive film means exposed in direct contact with said faceplate means.

4. An instant "daylight" system of recording a hard-copy film reproduction of a still cathode-ray tube monitor image, comprising an inanimate object, a monochromatic television camera means to scan said object, a color generator means together with a color control means to generate and assign selected colors for display of the output signal of said television camera means, a cathode-ray tube monitor means to display the color-representative output signals of said control means, a switching means to direct individually the color components of said monitor image into a cathode-ray tube image-printer means with electron-gun means for optimum electron-beam density and with optimum ultraviolet-emitting phosphor means deposited on its fiber-optic faceplate means, and ultraviolet-sensitive film means exposed in direct contact with said faceplate means.

5. An instant "daylight" system of recording a hard-copy film reproduction of a still cathode-ray tube monitor image, comprising a video frame scanner-data acquisition means, an image computer means to assemble a frame image of the output picture elements of said data acquisition means, a frame storage means to store an assembled video frame output of said image computer means, a pseudo-color console means to assign selected colors to signal levels output of said frame storage means, a cathode-ray tube monitor means to display the color-representative output signals of said pseudo-color console means, a switching means to direct individually the color components of the monitor image into a cathode-ray tube image-printer means with electron-gun means for optimum electron-beam density and with optimum ultraviolet-emitting phosphor means deposited on its fiber-optic faceplate means, and ultraviolet-sensitive film means exposed in direct contact with said faceplate means.

6. An instant "daylight" system of recording a hard-copy film reproduction of a still cathode-ray tube monitor image, comprising a facsimile color scanner means with color-representative analog signal outputs, an analog-to-digital converter means to convert each of said analog signals to digital-equivalent signals, a transmit modem means in which said digital-equivalent signals modulate appropriate carrier frequencies of a transmission link means, a receive modem means to recover said digital-equivalent signals from said carrier frequencies, a digital-to-analog converter means to reconvert said digital-equivalent signals to color-representative analog signals, a frame recorder/player means to store a frame of said color-representative analog signals output of said digital-to-analog converter means, a cathode-ray tube monitor means to display said color-representative analog signals when played back by said frame recorder/player means, a switching means to direct individually the color components of the monitor image into a cathode-ray tube image-printer means with electron-gun means for optimum electron-beam density and with optimum ultraviolet-emitting phosphor means deposited on its fiber-optic faceplate means, and ultraviolet-sensitive film means exposed in direct contact with said faceplate means.

7. An instant "daylight" flying-spot scanner system of recording a hard-copy film reproduction of a still cathode-ray tube monitor image, comprising a cathode-ray tube scanner means, (flying spot) with white light-emitting phosphor means, said tube scanner means input with horizontal and vertical blanking signals from a blanking amplifier means, said blanking signals input to said blanking amplifier means from a synchronizing generator means with synchronizing outputs also to horizontal and vertical sweep circuits of the systems' cathode-ray tube scanner means, the cathode-ray tube monitor means and the cathode-ray tube image-printer means, said white light-emitting phosphor means of said tube scanner means emitting an unmodulated white light beam, projected by a lens system means through a color transparency means which modulates said white light beam before passing through an additive primary light filter segment of a color-wheel means onto a multiplier phototube means with multiplier-phototube power supply means, said phototube means outputting a repetitive-frame color-representative video signal of the raster of said scanner means, as modulated by said additive light filter segment of the color-wheel means, the net video output of said phototube being a color-representative signal of a primary additive color separation of said color transparency means, a video amplifier means to amplify the output of said multiplier phototube and in turn output the video color-representative signal, modulated by a modulator means with input from said blanking amplifier, to both said cathode-ray tube monitor means and cathode-ray tube image-printer means, a segmented primary additive light filter color-wheel means in front of said white light-emitting phosphor of said tube monitor means, said color-wheel means color synchronous with said color-wheel means in front of said multiplier-phototube means, both color-wheel means rotated by individual interconnected servomotor means, and a cathode-ray tube image-printer means with electron-gun means for optimum electron-beam density and with optimum ultraviolet-emitting phosphor means deposited on its fiber-optic faceplate means, and ultraviolet-sensitive film means exposed in direct contact with said faceplate means.

8. An instant "daylight" system of recording a hard-copy film reproduction of a still cathode-ray tube monitor image, comprising an object means scanned by a television camera means through a lens means and an additive primary light-filter segment means, one of a number of repetitive light-filter segments of primary-additive colors assembled as a color-wheel means, rotated by a motor means at a rate such that the signal output of said camera is representative of a continuous sequence of primary additive color fields of said object, television transmitter means to transmit both the signal output of said camera and a synchronizing signal output of said motor via a transmission link means to a receiver-gate generator means whose outputs are a recovered synchronizing signal from said motor and primary additive color-representative fields on individual, respective color output lines by reason of gate generator distribution of said color fields, a two-position ganged-switching means in position to direct all color-representative signal outputs of said receiver-gate generator means into a cathode-ray tube monitor means, a momentary ganged-switching means at the outputs of said receiver-gate generator means to direct simultaneously a frame of each color-representative signal into a frame recorder/player means, said two-position ganged-switching means operated now to its alternate position to direct the color-representative signal outputs of said frame recorder/player means into said tube monitor means, a three-position switching means to direct individually color components of the tube monitor image into a cathode-ray tube image-printer means with electron-gun means for optimum electron-beam density and with optimum ultraviolet-emitting phosphor means deposited on its fiber-optic faceplate means, and ultraviolet-sensitive film means exposed in direct contact with said faceplate means.

9. An instant "daylight" system of recording a hard-copy film reproduction of a still cathode-ray tube monitor image, comprising an antenna means to receive a television signal, a television receiver means tuned to and operating to process said signal for display by a cathode-ray tube monitor means, a two-position ganged-switching means in position to direct all color-representative signal outputs of said television receiver into said monitor tube means, a momentary ganged-switching means at the outputs of said television receiver to direct simultaneously a frame of each color-representative signal output of television receiver into a frame recorder/player means, said two-position ganged-switching means operated now to its alternate position to direct the color-representative signal outputs of said frame recorder/player means into said monitor tube means, a three-position switching means to direct individually the color components of the tube monitor image into a cathode-ray tube image-printer means with electron-gun means for optimum electron-beam density and with optimum ultraviolet-emitting phosphor means deposited on its fiber-optic faceplate means, and ultraviolet-sensitive film means exposed in direct contact with said faceplate means.

\* \* \* \* \*